Jan. 11, 1955    G. L. BRYSON    2,699,020
BACK-UP WHEEL FOR ABRASIVE DISKS AND METHOD OF MAKING SAME
Filed April 8, 1953
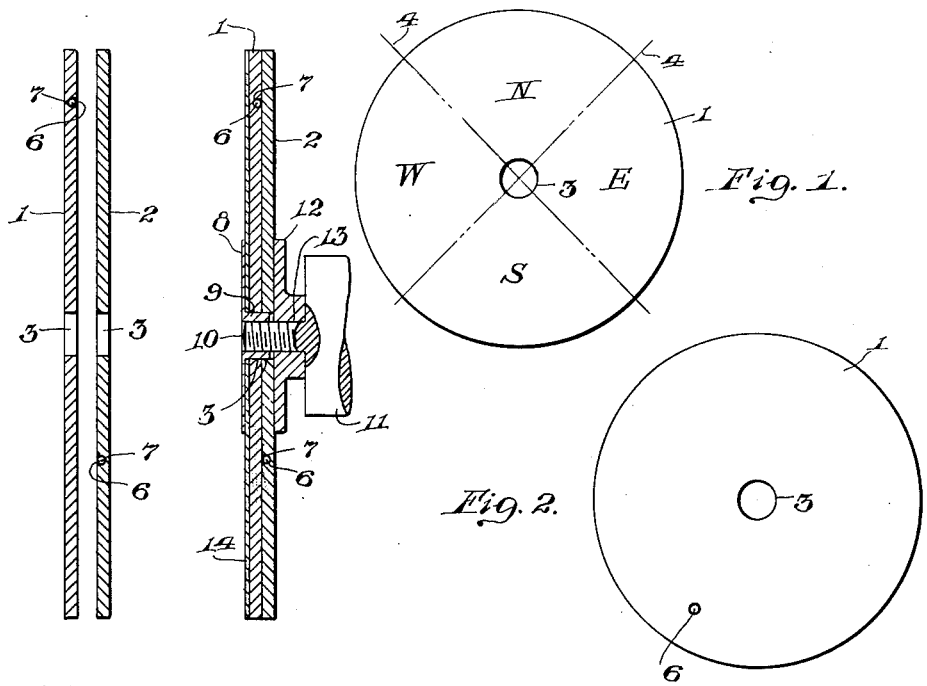
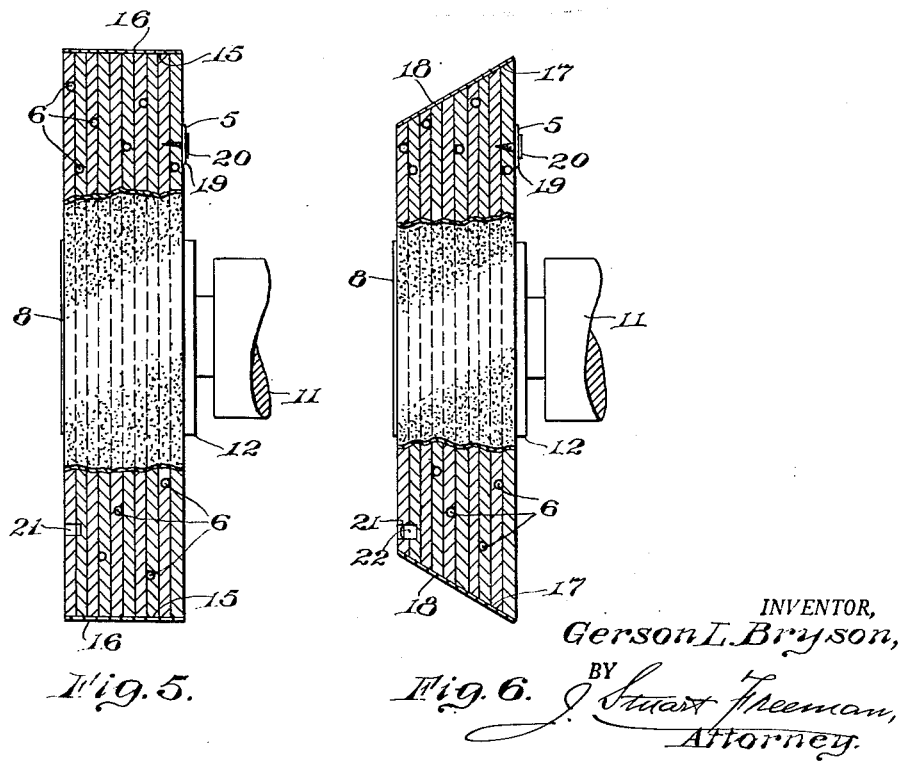
INVENTOR,
Gerson L. Bryson,
BY J. Stuart Freeman,
Attorney.

United States Patent Office 2,699,020
Patented Jan. 11, 1955

2,699,020

BACK-UP WHEEL FOR ABRASIVE DISKS AND METHOD OF MAKING SAME

Gerson L. Bryson, Bala-Cynwyd, Pa., assignor to Alexander Brothers Belting Company, Philadelphia, Pa.

Application April 8, 1953, Serial No. 347,581

15 Claims. (Cl. 51—169)

The object of the invention is to provide improvements in leather back-up wheels specifically, but in its broadest sense to provide an improved method of production and resulting leather product, which is particularly adapted to be rotated at high speeds, while functioning as the back-up wheel or faceplate for such articles as abrasive disks and the like, but not necessarily limited thereto, since said product can be used to advantage for many other purposes.

Another and more specific object is to provide laminated wheels that are adapted for rotation at high speeds, and in the use of which with such high speeds of rotation they are required to be free from vibration in any direction, independently of the restraint imposed therein by the bearings of the shafts that supports them, each of said wheels essentially comprising preferably a pair of circular laminations of leather, each of which has been statically balanced independently of each other before they are secured together in fixd unitary relation, maintenance of such prebalanced condition preferably being insured by securing to the initial flesh side of each lamination one or more weights, which may be of such character as so-called "BB" lead shot, sheets or strips of shim metal, variable lengths of wire or the like, after which said laminations are secured together with their said flesh surfaces adjoining each other, and preferably also with their correspondingly initially denser and heavier portions diametrically opposed to each other.

A further object is to provide a laminated wheel of this general character, which may comprise a plurality of any desired number of such laminations, each of which is prebalanced and the complete aggregation unitarily secured together by any suitable means, in order that to all intents and purposes the resulting wheel will be equivalent to an initially homogeneous solid mass, and which if desired may carry or be provided with a circumferentially extending cylindrical, conical, or other desired shape of abrasive surface, said laminations being first secured together preferably in pairs, and then a plurality of such pairs fixedly united.

Still another object is to provide an improved method of making a wheel of this type, which consists in providing two or more circular disks of leather of substantial thickness, and of such character as that used for sole leather and the like, statically balancing each of said disks, correcting the previous unbalanced condition of each disk by securing to or within the body of the disk one or more weights in the form of so-called "BB" shot, strips or plates of shim metal, wire, staples, or the like, the "BB" shot if used being preferably positioned in surface recesses of the same size, and then unitarily securing said disks together, preferably with their flesh sides facing each other, so that their initial hair-bearing surfaces are oppositely directed outwardly.

The balancing of the individual disks of the improved wheel is essentially confined to a condition of static balance, but if several such disks or multiple pairs of said disks are secured together, as when using their combined radially outer surfaces for carrying abrasive material, it might be that due to a more substantial longitudinal width or thickness of the wheel, it would be necessary, or at least desirable, to also balance the composite wheel unit dynamically, in which latter case in addition to the prebalancing of each disk statically, it may become advantageous to balance the said composite assembled mass dynamically as well.

It is well known that bodies of numerous types and materials have been statically and dynamically balanced, but as far as is known the materials involved have not been of leather, which possesses characteristics that are peculiar to itself. To illustrate, in a given hide there is no portion or section that is of the same thickness and density in all directions. Such differences as exist may in some instances be quite small and normally unappreciable, except as indicated by the most delicate scales, and even then possibly not detectable until rotated at high speeds, when the difference in weight between two given angular portions of such a disk are magnified to an appreciable degree, even though they may be no greater than that represented by the weight of a pencil mark, or a small portion of a postage stamp, or the like.

Bearing this in mind, it will be appreciated that in a given hide there is a constantly changing difference in thickness, density and/or weight, as one progresses from a point nearer to the back bone towards the center of the belly, and at the same time as one progresses from a point nearer the neck towards the tail area, while at the same time such changes differ irregularly and at constantly varying rates of change, and are frequently different upon the opposite sides of a given carcass, and few if any carcasses are exactly similar. These facts clearly indicate why it is a practical impossibility to find any two leather disks of the same diameter unbalanced to the same degree in all radial directions, which makes it necessary to balance each and every such disk separately, preferably using disks in a given pair cut from correspondingly opposite portions of the same hide as far as possible, in order to thereby minimize such inevitable differences, and even then positioning the disks of each pair in such angular relation about their common axis of rotation, as to make it possible for the characteristics of the various portions of one disk to offset similarly characteristic portions of the other disk, by counterbalancing each other as far as possible independently of their balance-correcting weights.

With reference to the exact method of balancing a leather disk, the same fundamental rules apply as with more regular and homogeneous substances, as for example a carefully produced body or iron, copper, brass, etc., in that a given correcting weight at four inches from the axis of rotation need be only one-half of an equally corrective weight at two inches from said axis. However, due to the absence of a constant or regular change in density and weight of a given piece of leather in any direction, it may be found advisable to first balance a given disk in well known manner upon knife edges, which will indicate pretty close to exactness the position and weight of a weight-correcting body in the major diameter of static unbalance, after which any residual condition of unbalance laterally or angularly of said first diameter can be further and perfectly corrected upon and by the use of a delicate rotary balancing machine, in order to take care of variations in the disk slightly transversely of said first diameter, resulting from the physical characteristics of any given animal from which the hide is taken.

With the objects and conditions involved being thus stated in general terms, the invention comprises further details, such as are hereinafter fully brought out in the following description, when read in conjunction with the accompanying drawings, in which Fig. 1 represents a disk of leather of any desired diameter and thickness before being balanced statically; Fig. 2 is a similar view showing the same disk after having been balanced, and provided with one or more balance-correcting weights secured thereto; Fig. 3 is a diametrical section of a pair of such disks prior to being fixedly secured together, and showing a representative method of securing the correcting weights to said disks; Fig. 4 is a similar section through a finished wheel comprising two representative laminations which have been respectively prebalanced, and also indicating a disk of abrasive material operatively secured to one face of such wheel; Fig. 5 is an elevation of a slightly modified form of wheel, having fragmentary portions thereof shown in section and providing an outer peripheral surface of sufficient longitudinal extent to form a support for a cylindrical abrasive medium; and Fig. 6 is an elevational view of a similar wheel with fragmentary portions shown in section, and providing a conical abrasive surface, each of said last-mentioned wheels being of substantially thicker mass than that shown in Fig. 4, and having also been dynamically balanced after being assembled, as well as its several initially separate and independent disks having been statically balanced before being assembled as a part of the unitary whole.

Referring to Figs. 1 to 4 inclusive, a pair of circular disks 1 and 2 are shown as being cut from relatively thick and fairly rigid leather, and having a central aperture 3 in each instance through which normally extends a mandrel, shaft, hub, or other desired means for operatively supporting said disks, while revolving at the usual high speeds that characterize abrasive disks and wheels. These two disks are as near alike as possible, as far as visibly indicating any differences in thickness, density, etc. They have preferably been selected and cut from such portions of a given hide as will tend to insure their being as nearly alike as possible, as for example from correspondingly opposite sides of the carcass, so that their variations and gradations in physical characteristics will be as nearly the same as possible.

For purposes of illustration, Fig. 1 has been subdivided by X-lines 4 into quadrants, that for ready reference will be referred to graphically by the compass designations N, E, S and W, and it will be assumed that said disk has been cut from the left side of a hide, thereby making the quadrant N nearer the saddle or spine, the quadrant E nearer the tail, the quadrant S nearer the belly and the quadrant W nearer the neck or shoulders. Due to the anatomical and physiological characteristics of the animal involving texture, density and resulting weight, and with all of said quadrants of exactly equal area, it will be appreciated that the quadrant N will tend to be a little heavier in weight than the lower quadrant S, while the quadrant W will tend to be a little lighter in weight than the diametrically opposite quadrant E.

Admitting these inescapable conditions, if the disk as shown were rotated at high speeds of several thousand revolutions per minute, it is quite evident that the statically unbalanced condition of the disk would cause a severe vibration of its supporting hub, mandrel, shaft, or the like, and it is to overcome this initial undesirable condition that the present process was developed. In the first place, if the quadrants W and E were equal, it would be a relatively simple matter to add weight to quadrant S and/or take weight from quadrant N. However, since there is a difference between the weights of quadrants W and E as well, the multiple components present make the addition or subtraction of weight conclusively effective neither in an exactly vertical diameter nor in a horizontal diameter, but in one or more positions angularly related to and somewhere between them. Or, if the unbalance between quadrants N and S are corrected, or correction be first made in such angularly related diameter as mentioned, it may be necessary to effect a secondary or auxiliary artificial corrective balance somewhere along a diameter angularly related to said first diameter.

In any case, one or more weights may be attached to the proper light-weight side of the disk, as in the case of strips of shim metal 5 (Figs. 5 and 6), or by means of small bodies of the nature of so-called "BB" shot 6, in which latter case it has been found desirable and effective to set such shot in recesses 7, that are drilled parallel with the axis of rotation of the disk, and thereby positioning the shot or similar weight within the plane surfaces and close to the center of the disk, while at the same time the radially outer sides of such recesses function to restrain said shot against dislodgement, resulting from the centrifugal forces that may be developed at high speeds. Radially of the disk, each shot or other form of weight, may be positioned at any desired, convenient, or most effective location, and it will be understood that if a given correcting weight is to be used, or can be used, for example, at a distance of 2" radially from the axis of the disk, a mere one-half of the same weight will be exactly as effective at a radial distance of 4" from such axis. From this fact it will be apparent, that if only weights of the same size are available, such as standard "BB" shot, it is not necessary to cut a shot in half, or a third, or a quarter, for example, but instead to select relative distances upon the same or both sides of the axis, whereby the position of one shot may either add to or subtract from the effectiveness of another shot, or other correcting weight, so that by properly selecting the position of one weight with respect to another in a multiple weight correction, the equivalent of any desired fractions of such weight unit may be effected.

After a pair of such leather disks have been as perfectly balanced as necessary, they are brought together preferably with the original flesh side of each against the other and effectively securing the correction weights in or upon them, and with their axial bores registering so as to jointly receive a hub, shaft, or the like, said disks being tightly cemented or otherwise secured together in such final relationship. As the component elements of a wheel unit, they may be operatively mounted upon any suitable support, but for purposes of illustration are here shown as being provided with a pad-nut comprising a relatively thin disk face 8 and an integral hub 9, that is internally bored and threaded so as to extend into the axial bore 3—3 of said back-up wheel, and at the same time receive the outer free end of a threaded stud 10, carried by and forming an axial extension of the live spindle 11 of a lathe, or other suitable rotatable driving means. Upon that side of said unit, opposite said pad-nut a plate 12 having a threaded bore 13 is secured upon said stud, and against said plate said wheel unit is fixedly secured by said pad-nut, when drawn tightly upon said stud by suitable means, such as a spanner wrench in well known manner. The outer surface of said pad-nut disk has secured to it a circular disk of emery cloth or other form of abrasive material 14, said abrasive disk being firmly and uniformly secured to said wheel. It is to be understood that the particular means for operatively supporting said disk and abrasive is a matter of choice, convenience, or available machine and accessories.

Referring to Figs. 5 and 6, there are shown two composite wheels of much smaller thickness, in fact of such number or plurality of leather disks, or pairs of disks, as to make up wheels having in the first instance (Fig. 5) a cylindrical surface 15 operatively supporting a cylindrical abrasive element, coating, or sheet 16, while the second instance (Fig. 6) there is provided a conical surface 17 operatively supporting a similarly shaped abrasive element, coating, or sheet 18, it being understood that together the resulting two curved abrasive surfaces are but illustrative of the many that can be provided, either independently of or in conjunction with the abrasive plane surfaces of the wheel shown in Fig. 4. Such wider wheels are secured to their supporting mechanisms in any suitable manner, which is here represented by the same elements and identifying numerals as above described.

In producing a wider wheel than is represented by a single pair of disks, the resulting mass becomes proportionately elongated in alignment with the axis of rotation, and this condition may develop a degree of dynamic unbalance that must be corrected. Thus for example, while each initial pair of disks has been statically balanced, a slight degree of unbalance that would not otherwise manifest itself may be magnified to such extent that the wider wheel tends at high speeds to wabble, due to wholly unseen weights that are not diametrically opposite, and which therefore may pull upwardly at one end and downwardly at the other end, although if not revolving the wheel would remain static in any angular position in which it might be placed on a pair of knife edges.

To accomplish the necessary degree of dynamic balance required in a given case, a piece of metal 19 may be added on one face, and secured in fixed position by any suitable means as represented by the conventional screw 20 and duplicated upon the opposite end face in similar manner, or in one or both of such positions a hole 21 may be drilled at a convenient distance from the axis and a weight plug 22 inserted and secured in such hole or holes, the same rule applying as to the relation of the heaviness of said weights as hereinbefore referred to in correcting for static unbalance.

Having thus described my invention, what I claim and desire to protect by Letters Patent of the United States is:

1. A leather wheel comprising a pair of unitarily secured laminations, each of which is statically balanced independently of the other by artificial weighting within and closely adjacent to its plane of lamination, to effect and maintain a static balance of said wheel.

2. A wheel, comprising a pair of unitarily secured laminations, each of which is initially of uneven weight distribution diametrically, and each of said laminations being independently balanced artificially by a weight secured within and closely adjacent to its plane of lamination.

3. A leather wheel, comprising a plurality of homogeneous laminations of uniform thickness unitarily secured together, each of said disks having a metallic weight secured within closely adjacent to its plane of lamination, and operative to statically balance the wheel as a unit.

4. A leather wheel, comprising a plurality of homogeneous laminations unitarily secured together, and a metallic weight embedded in a recess in the covered surface of each of said laminations, and so positioned as to statically balance said wheel as a unit.

5. The method of making a back-up wheel for abrasive surfaces, which consists in providing a pair of homogeneous leather disk laminations, statically balancing each of said laminations independently of the other, correcting the initial unbalance of said individual laminations by placing metallic weights in recesses in the adjacent surfaces of said laminations, and then securing said laminations together to secure said weights in said recesses and to form a balanced unit with said weights revolvable in closely adjacent planes.

6. The method of making a back-up wheel for abrasive disks, which consists in providing a plurality of homogeneous leather disk laminations, statically balancing each of said laminations independently of the others, correcting the initial unbalance of each of said laminations by means of a properly positioned weight, in each instance secured only within the covered surfaces of the respective laminations, and then securing said laminations together to form a unit.

7. The method of making a laminated wheel adapted to be rotated at high speeds, which consists in providing a pair of leather disks, statically balancing each of said laminations independently of the other, correcting the initial unbalance of said laminations by means of properly positioned weights, in each instance within a recess in the flesh surfaces of said laminations, and then securing said laminations together to thereby provide a unitary structure and simultaneously secure said weights in said recesses.

8. The method of making a laminated wheel to be rotated at high speeds, which consists in providing a pair of leather disks, each of which is characterized by different weights in a given diametrical direction, and also by different weights in a diametrical direction angularly related to said first direction, correcting the initial unbalance of said laminations in substantially all diametrical directions by means of properly positioned initially extraneous weights secured in each instance to and within recesses in the surfaces of said laminations, and then securing said laminations together to thereby provide a unitary structure and simultaneously secure said weights in said recesses.

9. A leather wheel, comprising a plurality of initially statically unbalanced laminations unitarily secured together, each of said laminations having at least one recess in a surface covered by another lamination, and weights secured in said recesses by the respectively adjacent laminations, to effect static balance of each lamination and of said wheel as a unit.

10. A leather wheel, comprising a plurality of initially statically unbalanced laminations unitarily secured together, each of said laminations having at least one recess in a surface covered by another lamination, and weights secured in said recesses by the respectively adjacent laminations, to effect static balance of each lamination and of said wheel as a unit, and at least two additional weights secured to diametrically opposite portions of said wheel in spaced planes of rotation, to effect and preserve dynamic balance of said wheel.

11. The method of making a laminated leather wheel adapted to be rotated at high speeds, which consists in testing each of a plurality of leather laminations for static unbalance, statically balancing each of said laminations independently of the others, securing said statically balanced disks together in unitary relation, testing the resulting wheel for dynamic unbalance, and then correcting whatever degree of residual dynamic unbalance may be discovered by means of at least two additional weights secured to diametrically opposite portions of said wheel in spaced planes of rotation, to effect and maintain dynamic as well as static balance.

12. The method of making a laminated leather wheel adapted to be rotated at high speeds, which consists in testing each of a plurality of leather disks for static unbalance, inserting weights in recesses in the plane surfaces of said disks to statically balance them, unitarily securing said disks together and thereby simultaneously securing said weights in said recesses, testing the resulting unit for dynamic unbalance, and then adding additional weights to diametrically opposite portions of said wheel in spaced parallel planes, to effect and maintain dynamic as well as static balance.

13. A wheel, comprising a pair of similar leather laminations secured together, each of said laminations being statically unbalanced, and said laminations being assembled with the lighter side of one adjacent to the heavier side of the other, so that the composite wheel is in static balance.

14. A wheel, comprising a plurality of substantially similar leather laminations secured together, said laminations being assembled with the lighter side of one diametrically positioned with respect to the heavier side of another of a given pair, so that the composite wheel will be in static balance.

15. A wheel, comprising a pair of similar leather laminations secured together, each of said laminations being statically unbalanced, and said laminations being assembled with the lighter side of one adjacent to the heavier side of the other, so that the composite wheel is in static balance, and the original flesh side of one lamination being adjacent to the corresponding side of the other.

References Cited in the file of this patent

UNITED STATES PATENTS

| Number | Name | Date |
|---|---|---|
| Re. 399 | Boardman | Oct. 7, 1856 |
| Re. 20,207 | Simonds | Dec. 15, 1936 |
| 289,910 | Grunder | Dec. 11, 1883 |
| 341,925 | Lemassena | May 18, 1886 |
| 533,707 | Fuller et al. | Feb. 5, 1895 |
| 1,532,687 | Darling et al. | Apr. 7, 1925 |